United States Patent [19]

Aigner

[11] 4,232,550
[45] Nov. 11, 1980

[54] FLOWMETER FOR LIQUIDS
[75] Inventor: Georg Aigner, Leonberg, Fed. Rep. of Germany
[73] Assignee: KDM Elecktronik GmbH, Nuremberg, Fed. Rep. of Germany
[21] Appl. No.: 416
[22] Filed: Jan. 2, 1979
[30] Foreign Application Priority Data
Dec. 31, 1977 [DE] Fed. Rep. of Germany ....... 2759176
[51] Int. Cl.³ .............................................. G01F 3/12
[52] U.S. Cl. ..................................................... 73/258
[58] Field of Search ................................. 73/258, 273
[56] References Cited
U.S. PATENT DOCUMENTS

| | | | |
|---|---|---|---|
| 569,271 | 10/1896 | Bassett | 73/258 |
| 588,646 | 8/1897 | Lambert | 73/258 |
| 608,168 | 8/1898 | Bassett | 73/258 |
| 1,192,189 | 7/1916 | Hanks | 73/258 |
| 2,766,733 | 10/1956 | Jacobson | 73/258 |
| 2,826,916 | 3/1958 | Lang | 73/273 |
| 3,442,126 | 5/1969 | Southall | 73/258 |

Primary Examiner—Herbert Goldstein
Attorney, Agent, or Firm—Allison C. Collard; Thomas M. Galgano

[57] ABSTRACT

A flowmeter for liquids includes a hollow housing having an internal metering chamber, at least two liquid connections coupled to the housing and communicating with the metering chamber for establishing a liquid flow therethrough, a generally disc-shaped wobble plate having a centrally-disposed spherical wobble center mounted within the metering chamber and non-contacting coacting signal transmitter elements associated with the housing and wobbler plate for generating signals which proportionally correspond to the wobble frequency of the wobble plate. The flowmeter is especially suited for measuring small or weak liquid flows.

4 Claims, 11 Drawing Figures

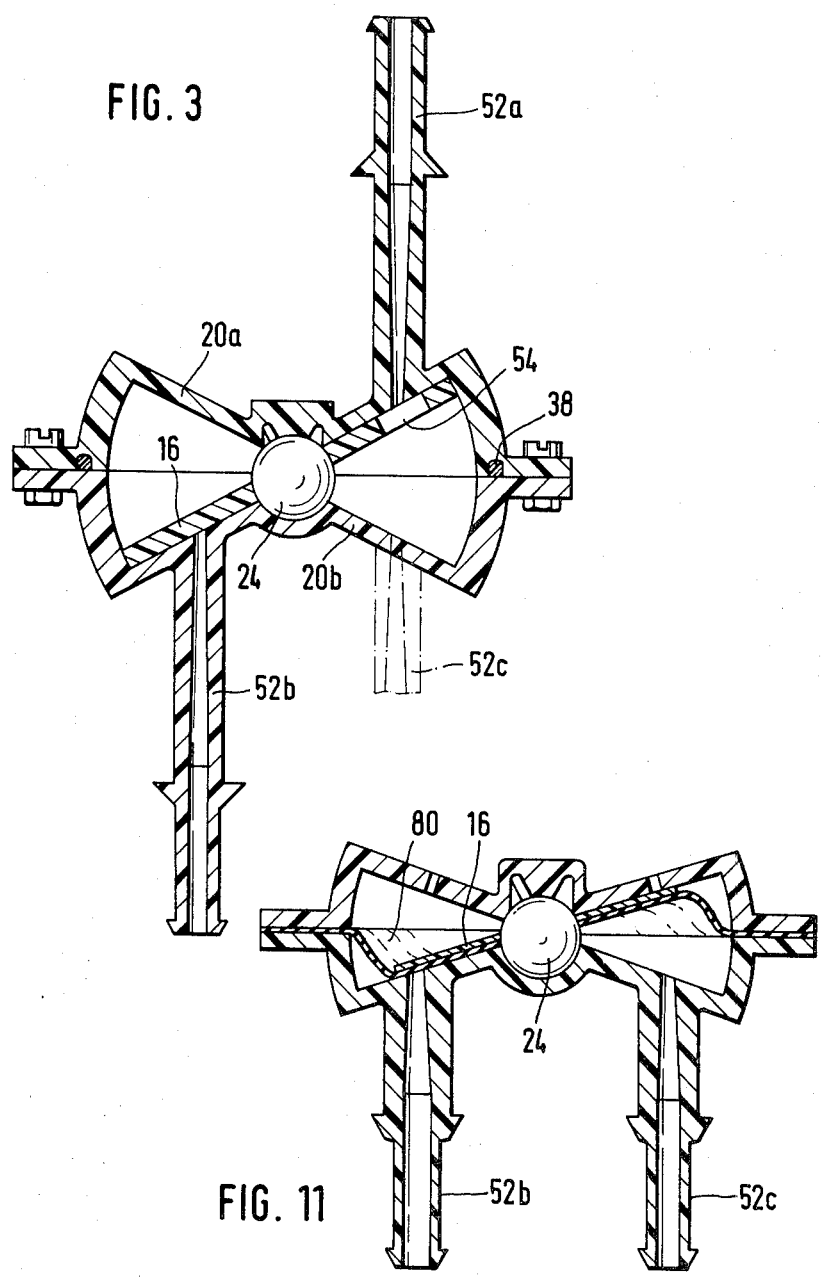

FLOWMETER FOR LIQUIDS

The present invention relates to a flowmeter for liquids. More particularly, it relates to a liquid flowmeter having a housing, a metering chamber rotationally symmetrically positioned within the housing with respect to a central axis, connections for the liquid which discharge into the metering chamber, and a circular wobble plate or separating wall which separates the metering chamber into two partial chambers and which is movably mounted for movement about the central axis by means of a wobbling or tumbling center for carrying out a wobbling or tumbling movement in the metering chamber. The metering chamber is substantially symmetrical with respect to the central axis and in cross-section is defined by two oppositely-disposed upper and lower faces in the form of truncated cone-shaped chamber walls, each of which has a truncated cone tip which is located in close proximity to the wobble center and a spherical annular wall which connects the outer edges of the front faces, and which extends concentrically with respect to the wobble center. The adjacent segments of the front faces are provided with concentric ball sockets directed towards the tumbling center. A spherical element is mounted in these ball sockets and is disposed in the center of the separating wall. The spherical element has a radially outwardly extending shoulder which is disposed normally with respect to the separating wall. This shoulder engages an annular groove in one of the ball sockets in such a way that the shoulder forms an angle with the central axis which complements the included conical angle of the front faces to define an angle of about 180°.

Such volume meters which act as flowmeters are known as so-called "swash" or "wobble plate" meters. The liquid which enters the metering or measuring chamber through one of the liquid connections displaces the wobble plate or separating wall which carries out a wobbling or tumbling movement during which a line of contact is made in the direction of a directrix between the separating wall and the upper and lower surfaces on the truncated cone-shaped front faces. Thereby, the liquid enters a circulating chamber and is fed to the other liquid connection through which the liquid discharges. Such volume meters are provided with a linear quantity measuring curve over the relatively large, total measuring range with a very small degree of measuring error. Hence, such volume meters are suitable in cases where it is important to obtain exact measurements, for example, in the medical field. However, in the medical field the through flow quantity is typically relatively low which is the reason the swash or wobbler plate meters were not used in medical devices, despite their high degree of accuracy. The reason for this is that the known swash plate meters have a noticeable internal friction which creates a resistance to the liquid flow, so that a certain static pressure is required. In addition, the inert mass of the moveable parts for actuating the meter must also be considered, so that these types of meters were not suitable for measuring small and minute liquid flows.

It is therefore an object of the invention to provide an improved flowmeter of the aforementioned "swash" or "wobbler plate" type which can also be used for measuring small and minute liquid flows. For this reason, the mass of the moveable parts must be kept low and the internal friction must be substantially eliminated. The volume of the meter must be kept very low so that it can be used for the aforementioned measuring purposes. Furthermore, the structure should be simple and economical having a minimum of individual parts which may be substantially made from a suitable plastic.

The object of the invention is obtained in that a flowmeter is provided having a housing and a measuring chamber with associated liquid connections. The chamber is separated into two separate portions along a plane extending through the central axis of the wobble center. The separating wall at its circumference is sealed off with respect to the measuring chamber wall. The separating wall, on the one hand, and the housing, on the other hand, are provided with contactless coacting signal transmitting elements which generate signals proportionally corresponding to the wobble frequency.

This arrangement does not only result in a very simple structure of the device, but also results in a flowmeter wherein the masses of the meter parts through which the liquid has to flow are kept very low. As a result, the device affords practically no resistance to the liquid flow therethrough when metering or measuring such flow. The internal friction of the flowmeter is the result of mounting the separating wall in a sealing manner within the housing. It is necessary that the seal only exerts a minimum on friction due to the fact that the flowmeter is exposed to a very low static liquid pressure.

In a particularly advantageous embodiment of the invention, the circumferential edge of the separating wall is provided with a radial groove which opens outwardly and which receives a spring-elastic sealing ring which consists of a slotted annular-like part which on the radially inner side thereof is provided with radially-inwardly directed spring elastic deformable protrusions which can be outwardly deformed.

In another advantageous embodiment of the invention the edge segment of the separating wall which engages the inner wall of the measuring chamber has a low axial dimension with respect to the axial dimension or thickness of the separating wall. In effect, this means that the separating wall engages the measuring chamber wall with a membrane-like lip.

In a further advantageous embodiment of the invention, the separating wall is coupled to the wall of the measuring chamber by means of a highly flexible membrane, which is preferably a thin rubber membrane, and both liquid connections are located on one side of the separating wall.

In a still further advantageous embodiment of the invention, the spherical element has a diametrical bore extending therethrough at an angle to the axis of the shoulder which engages the annular groove. This bore presents, at least in one chosen position of the separating wall, a light transmission tunnel or channel for the light sensing and generating device.

In a further advantageous embodiment of the invention, the shoulder on the spherical element which engages the annular groove comprises a spring-loaded bearing pin which is mounted in a bearing element and which extends radially outwardly from the spherical element.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits and scope of the invention.

In the drawings, wherein similar reference characters denote similar elements throughout the several views:

FIG. 3 is a schematic cross-sectional view of an alternate embodiment of the invention which is similar to that of FIG. 1 but which is provided with liquid connections which are parallel to the flowmeter's separating wall axis of rotation, and which further shows, in phantom view, a variation in the liquid connection positioning;

FIG. 11 is a schematic, axial sectional view through a further embodiment of the inventive flowmeter.

Figure 1:
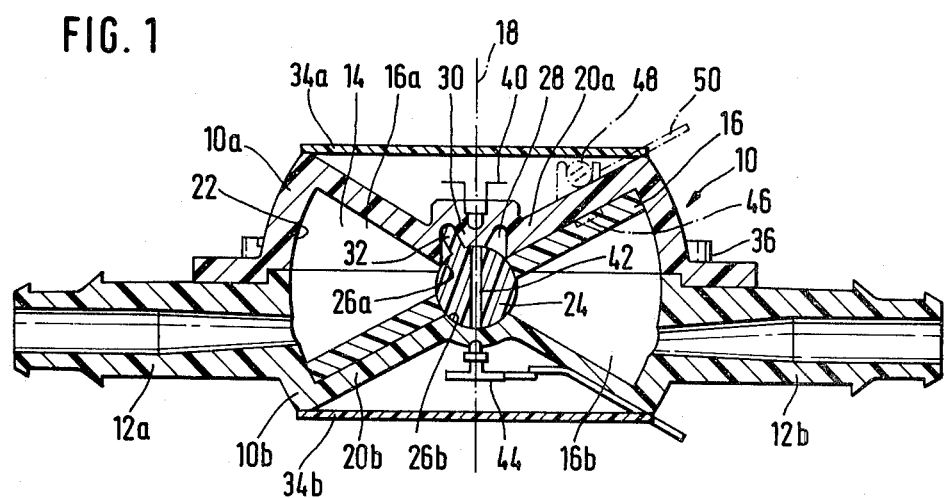
FIG. 1 is a cross-sectional view of a flowmeter embodying the present invention.

Referring now in detail to the drawings, the flowmeter made in accordance with the present invention is shown in FIG. 1 and it includes a housing 10 which consists of an upper housing part 10a and a lower housing part 10b. On lower housing part 10b, two oppositely-disposed liquid connections 12a and 12b are provided. A measuring chamber 14 is provided within the housing which is separated into two partial chambers 16a and 16b.

The measuring chamber is substantially rotationally symmetrically shaped with respect to a central axis 18 and is limited or defined by two spaced-apart oppositely-tapered truncated cone shaped upper and lower walls or faces 20a and 20b, and a spherical annular segment or wall 22 which joins walls 20a and 20b together. A separating wall or wobble plate 16 is disposed in chamber 14 and is provided with a central spherical bearing element which is associated with two ball sockets 26a and 26b each mounted respectively in the two housing parts 10a and 10b. An annular groove 28 is provided in ball socket 26a of the upper housing part 10a so as to define a truncated, cone-shaped pin 30 surrounded by the groove 28. A radially-protruding shoulder 32 is provided on spherical bearing element 24 which engages groove 28 and thereby guides the separating wall in such a way that the wall can carry out a wobble or wobbling movement within the housing.

As can be seen in FIG. 1, the housing of the flowmeter essentially consists of the two separate wall parts 10a and 10b. Sufficient space is provided in the spherical spaces outside of the measuring chamber 14 in order to mount the required devices for monitoring the rotation of separating wall 16.

To protect these devices, cover plates 34a and 34b are mounted on the housing parts by suitable locking means (not shown). Both housing parts 10a and 10b are coupled together along a circumferential flange by means of screws 36. At the engaging or abutting portions of the two housing parts 10a and 10b an annular seal 38 may be provided, as shown in FIG. 3, for example.

When a liquid stream is fed from one liquid connection to the other liquid connection through housing 10, separating wall 16 carries out a wobbling movement. The speed of the wobbling movement is a parameter of the throughflow quantity. This speed may be measured by suitable transmitting means and transferred into a corresponding signal.

In the embodiment shown in FIG. 1, a light-emitting infrared diode or another light source 40 is schematically shown coupled to the upper housing portion 10a. Central bearing element 24 of separating wall 16 is provided with a light-transmitting channel or bore 42 which, during the wobble movement of the separating wall 16, couples the infrared diode 40 optically with a phototransistor 44 after each wobble rotation. The phototransistor is mounted in the lower housing part 10b, so that each wobble rotation is indicated by a pulse which is transmitted from the phototransistor 44. This pulse may be fed to a pulse counter, for example. Hence, a contactless signal is generated which does not create a resistance to the movement of separating wall 16 and, therefore, in turn, to the flow of the liquid itself.

Figure 2:
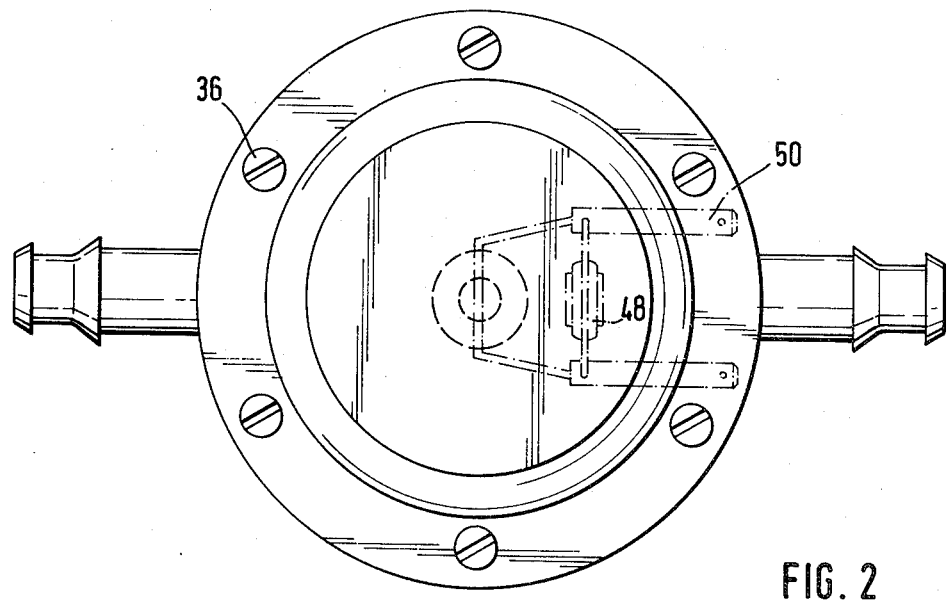
FIG. 2 is a plan view of the flowmeter shown in FIG. 1.

As an alternate embodiment, a permanent magnet 46 may be mounted on separating wall 16 at a distance from the wobble center which is identical with the center of the bearing element 24, and that at a corresponding defined place on housing 10, a Reed contact 48 is mounted (see FIG. 2). From the housing to the outside thereof suitable electrical connections are provided which are identified by reference numeral 50.

In order to indicate the wobble rotation, a person has many possibilities, for example, the use of an approximation switch, a reflection lignt barrier, a field plate, a Hall generator, etc.

FIG. 3 shows an alternate embodiment of the housing with respect to the one shown in FIG. 1, wherein the difference is substantially in that the liquid connections 52a and 52b are mounted in axially parallel directions and discharge into chamber 14 at different locations-namely, through front faces 20a and 20b. For this reason, it is required that separating wall 16 be provided with an opening 54 for the liquid connections, so as to allow the flow of liquid through the device. If this would not be so, both axially parallel liquid connections would discharge into the same front face, as is shown, for example, for the front face 20b by the connection 52c shown in phantom line (and as is the case in the later described embodiment in accordance with FIG. 11).

Figure 6:
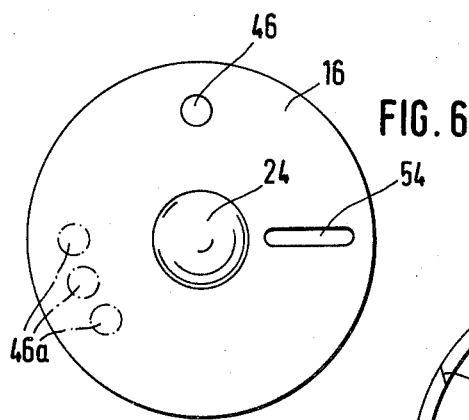
FIG. 6 is a schematic plan view of the flowmeter separating wall.

FIG. 6 schematically illustrates a plan view of the separating wall used in association with the FIG. 3 embodiment which clearly shows the required opening 54. FIG. 6 also shows that on the separating wall a signal transmitter may be positioned, for example, in the form of a magnet 46 for induction scanning, an approximation switch, a Reed contact, or the like, or a mirror for a light reflection sensing device. Such elements may be mounted in a relatively large number, as is shown by the three elements 46a, for example, if this is deemed necessary for increasing the measuring resolution capability of the device.

Figure 4:
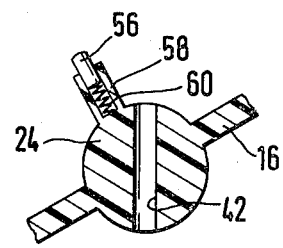
FIG. 4 is a sectional view through the center zone of the flowmeter separating wall.

A particular advantageous embodiment for mounting the separating wall in a reliable manner and with the least amount of friction is shown in FIG. 4. In this embodiment, the radial shoulder 32 which engages groove 28 consists of a spring bearing pin 56 which is radially slidably mounted in a radial guide 58 on bearing element 24 and is spring-loaded in a radially outward direction by a pressure spring 60.

In FIG. 4, the light-transmission bore 42 is readily recognizable. This light-transmitting bore has the advantage that no medium is present in the range of the light-sensing elements so that the flow meter is also suitable for non-transparent mediums, for example, blood.

Figure 5:
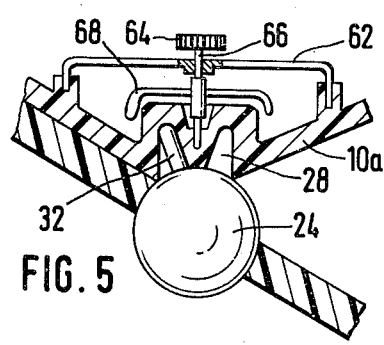
FIG. 5 is a sectional view similar to that of FIG. 4, but further showing an adjacent segment of a housing portion on which is mounted an alternate embodiment of a contactless monitoring device.

FIG. 5 shows another embodiment of the contactless signal transmission. In this case, bearing yoke 62 is positioned on the front face 10a. A measuring shaft 66 is rotatably mounted on yoke 62 and coaxially-disposed with respect to the central axis 18. A pinion 64 is secured to the outer end of shaft 66. A yoke 68 made of soft iron or magnetic material is fixed to shaft 66. In this case the radial shoulder 32 which is mounted on bearing element 24 is preferably a magnet and pulls the metallic yoke 68 along during its rotation in groove 28, so that its movement is transmitted to pinion 64 for effecting suitable measurements. Instead of pinion 64, another suitable device may be used which may indicate the number of wobble rotations.

Figure 7:
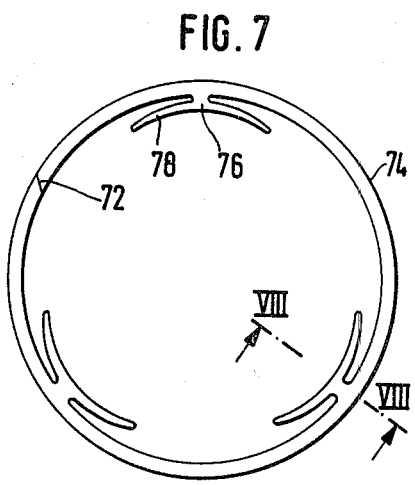
FIG. 7 is a plan view of a sealing ring used in association with a particular embodiment of the separating wall.
Figure 8:
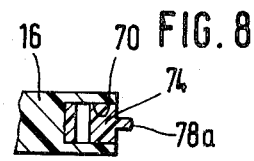
FIG. 8 is a sectional view of the seal shown in FIG. 7, taken along line VIII—VIII thereof; further showing the peripheral portion of a separating wall in which the seal is mounted.

The construction of the seal in the construction of the flowmeter between the separating wall 16 and the spherical housing wall 22 is of particular importance, so as to keep the inner friction as low as possible. A particular solution to this problem is shown in FIGS. 7 and 8. FIG. 8 shows the edge portion or segment of a separating wall 16 which is provided with a circumferential groove 70 which opens radially to the outside. This groove 70 receives a sealing ring 74 (FIG. 7) which is slotted, at 72, like a piston ring. Ring 74 is preferably provided with, at equidistantly circumferentially-spaced-apart positions, at least three radially-inwardly directed spring deformable shoulders 76 which are preferably provided with arcuate support shoulders 78 which are arched in the same arcuate direction as ring 74, but with a somewhat smaller radius, so that the free ends of the support shoulders engage the base of groove 70 and push the ring 74 radially outward against housing wall 22.

Figure 10:
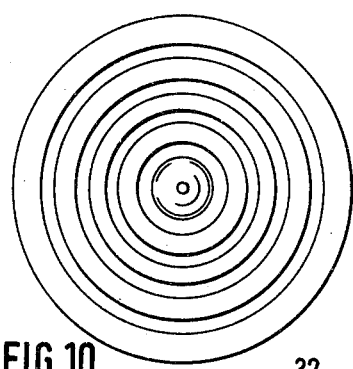
FIG. 10 is a plan view of the separating wall shown in FIG. 9.
Figure 9:
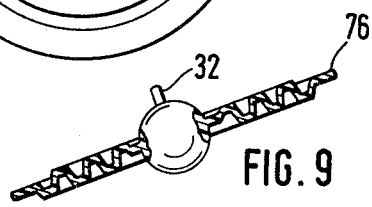
FIG. 9 is an axial sectional in part elevational view through a further embodiment of a separating wall.

FIGS. 9 and 10 illustrate another solution to the sealing problem. The separating wall 16, as can be seen from the radial cross-section in FIG. 9, has a wave-shaped or corrugated profile and is shaped from spring elastic material, so that the outer edge 76 engages the housing wall 22 in a spring-elastic or resilient manner. This outer edge 76 has a very low axial dimension with respect, and in comparison, to the axial thickness of the separating wall 16, so that the engagement or contact face between the separating wall and the housing is very small, resulting in a very low friction therebetween. In the same fashion the sealing ring 74 has at its outer circumference a sealing lip 78a with a very small axial dimension.

FIG. 11 illustrates a structure which provides a different solution for the sealing problem. A thin rubber membrane 80 is clamped, on the one hand, between the joint of housing parts 10a and 10b and, on the other hand, is coupled with the separating wall 16. In this embodiment, no frictional forces are generated between the separating wall and the housing wall since only a very insignificant deflection force has to be exerted on the rubber membrane. The sensitivity of the flowmeter is further increased with this embodiment. No leaks due to wear and tear of the abrading seal can occur. In such a flowmeter, the volume would be kept extremely low, so that energy losses due to the long deflection paths of the membrane are prevented.

All heretofore described meters have a very simple structure and are preferably made of plastic material. They are suitable for measuring the lowest possible linear through flow quantities and are suitable for use in association with flow mediums having a very large viscosity range.

Thus, while only several embodiments of the present invention have been shown and described, it will be obvious to those persons of ordinary skill in the art, that many changes and modifications may be made thereunto, without departing from the spirit and scope of the invention.

What is claimed is:

1. A flowmeter for liquids, comprising:
    a hollow housing having two opposed, axially-aligned, inwardly-tapered, and spaced-apart truncated cone-shaped walls, each of which has an outer peripheral edge and a generally spherical segment-shaped annular wall which interconnects the outer peripheral edges of said truncated cone-shaped walls and defines therewith an internal metering chamber which is positioned in a rotationally symmetric manner with respect to a central axis coaxial with the axes of said cone-shaped walls and which is symmetrically configured with respect to a plane passing through said central axis, said truncated, cone-shaped walls each having a centrally-shaped coaxially-aligned ball socket formed therein, one of which has an annular groove formed therein;
    at least two liquid connections coupled to said housing and communicating with said metering chamber for establishsing a liquid flow therethrough;
    a generally disc-shaped wobble plate having a centrally-disposed spherical wobble center mounted within said metering chamber with said spherical wobble center thereof rotatably retained between said ball sockets, said wobble plate dividing said chamber into two subchambers, defined by a plane extending through said central axis, said spherical center having a radially outwardly extending shoulder which is disposed generally normally relative to said wobble plate and which is slidably received within said annular groove formed in one of said ball sockets, said shoulder being disposed at an angle to said central axis which complements the conical angle of said cone-shaped walls to form a combined angle of about 180°, said wobble plate having a circumferential edge which is in resilient sealing engagement with said annular wall, said circumferential edge of said plate being provided with a circumferentially-extending groove which opens outwardly and wherein a resilient sealing ring is received within said radial groove which comprises a slotted ring having a radially inner side from which extends, in a radially inward direction, a plurality of resilient protrusions which can be radially deformed in a radially outward direction; and non-contacting coacting signal transmitter elements associated with said housing and wobbler plate for generating signals proportionally corresponding to the wobble frequency of said wobble plate.

2. The flowmeter according to claim 1, wherein said plurality of protrusions are equidistantly spaced apart on said ring and wherein each protrusion with respect to the radius which crosses the mounting position of the protrusions is symmetrically arranged, and that obliquely and inwardly directed support shoulders are provided at said mounting positions for the protrusions.

3. The flowmeter according to claim 2, wherein said support shoulders are arched in the same manner as said ring but have a smaller radius.

4. The flowmeter according to claim 1, wherein the circumferential edge of said plate which engages said annular wall has a smaller axial dimension relative to the axial dimension of the remainder of said plate.

* * * * *